United States Patent [19]

Carangelo et al.

[11] Patent Number: 5,486,917
[45] Date of Patent: Jan. 23, 1996

[54] FLEXTURE PLATE MOTION-TRANSFER MECHANISM, BEAM-SPLITTER ASSEMBLY, AND INTERFEROMETER INCORPORATING THE SAME

[75] Inventors: Robert M. Carangelo, Glastonbury; Mark D. Dettori, Farmington; Lawrence J. Grigely, South Windsor, all of Conn.; Terence C. Murray, Winchester, Mass.; Peter R. Solomon, West Hartford, Conn.; C. Peter Van Dine, Bolton, Conn.; David D. Wright, Vershire, Vt.

[73] Assignee: On-Line Technologies Inc, East Hartford, Conn.

[21] Appl. No.: 201,757

[22] Filed: Feb. 25, 1994

Related U.S. Application Data

[63] Continuation-in-part of Ser. No. 837,622, Jan. 6, 1992, Pat. No. 5,349,438, which is a continuation-in-part of Ser. No. 773,225, Oct. 9, 1991, Pat. No. 5,196,902.

[51] Int. Cl.$^6$ ........................................ G01B 9/02
[52] U.S. Cl. ........................................ 356/346; 359/871
[58] Field of Search ........................... 356/346, 345; 359/871, 873

[56] References Cited

U.S. PATENT DOCUMENTS

| | | | |
|---|---|---|---|
| 4,537,508 | 8/1985 | Doyle | 356/346 |
| 4,544,272 | 10/1985 | Doyle | 356/346 |
| 4,556,316 | 12/1985 | Doyle | 356/346 |
| 4,657,390 | 4/1987 | Doyle | 356/346 |
| 4,735,505 | 4/1988 | deMey, II et al. | 356/345 |
| 4,773,757 | 9/1988 | Doyle | 356/346 |
| 4,779,983 | 10/1988 | Learner et al. | 356/346 |
| 4,883,356 | 11/1989 | deMey, II | 356/346 |
| 4,915,502 | 4/1990 | Brierley | 356/346 |
| 5,066,990 | 11/1991 | Rippel | 356/346 |
| 5,150,172 | 9/1992 | Brierley | 356/346 |
| 5,153,675 | 10/1992 | Beauchaine | 356/346 |
| 5,159,405 | 10/1992 | Ukon | 356/346 |

OTHER PUBLICATIONS

Interferometer For Fournier Spectroscopy—W. H. Steel pp. 43–53.
Interferometer Design and Data Handling in a High–Vibration Environment—Part I: Interferometer Design Ronald P. Walker & John D. Rex—SPIE. vol. 191 pp. 88–95.
Griffith and De Haseth—Fourier Transform Infrared Spectrometer—John Wiley & Sons, Chapter 4 pp. 121–165.

*Primary Examiner*—Samuel A. Turner
*Attorney, Agent, or Firm*—Ira S. Dorman

[57] ABSTRACT

A multiplicity of one-piece flexure plates are assembled in pairs to provide a support system on which a retroreflector may be mounted for reciprocal motion. Combined with balance bodies, the flexure plates provide a support system having portions that are dynamically and statically balanced with one another, irrespective of orientation, so as to thereby immunize the unit against extraneous forces. The motion transfer assembly is especially adapted for use to support a moving retroreflector in a two-arm interferometer that may further include a beamsplitter assembly constructed from a one-piece, integrally formed body, the body having convergent, optically flat planar surfaces of specular reflectance, and means for adjustably mounting a beamsplitter therein. The spectrometer is of modular construction, and employs an integrated clocking sub-assembly as well as a lightweight voice-coil motor.

25 Claims, 13 Drawing Sheets

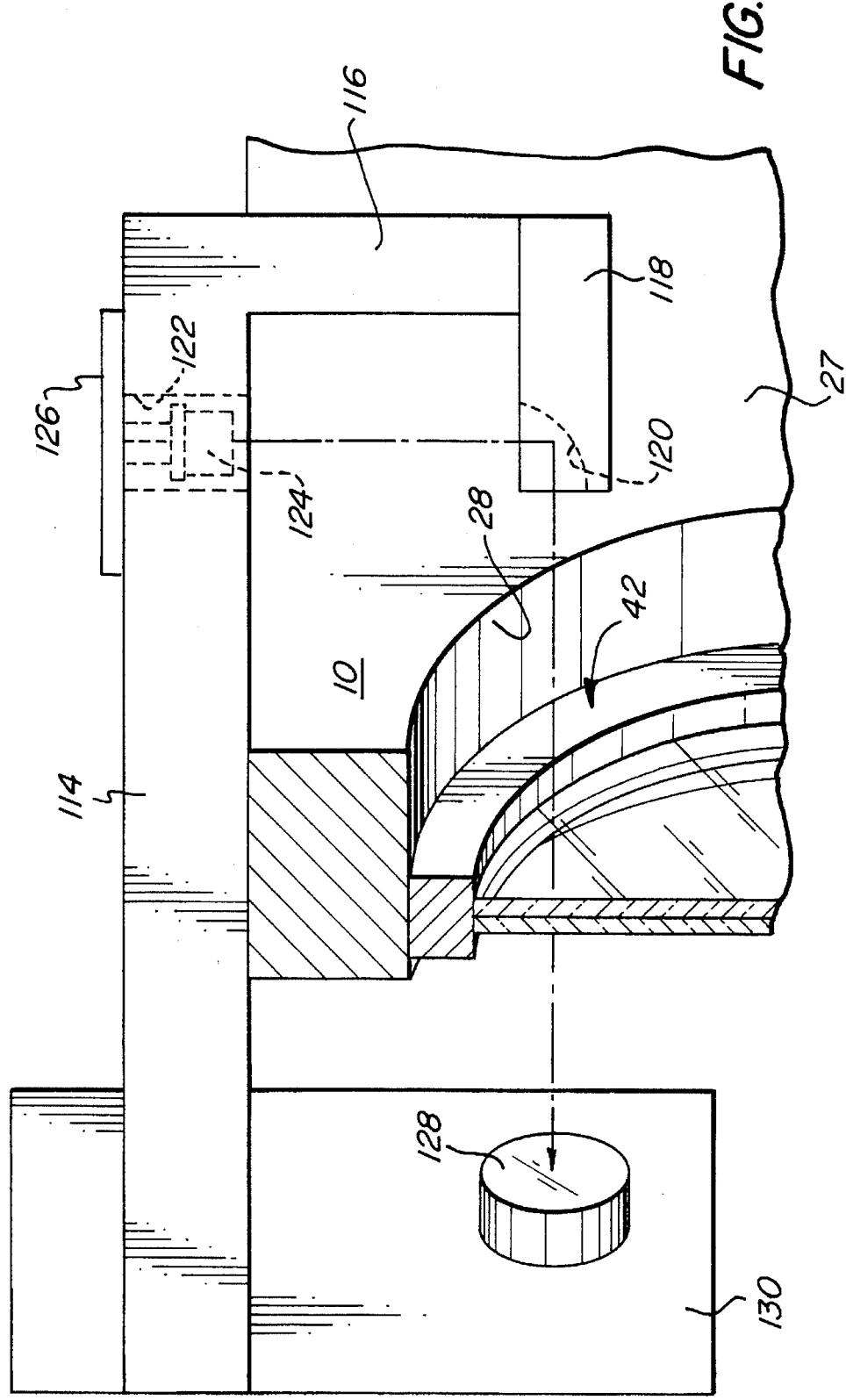

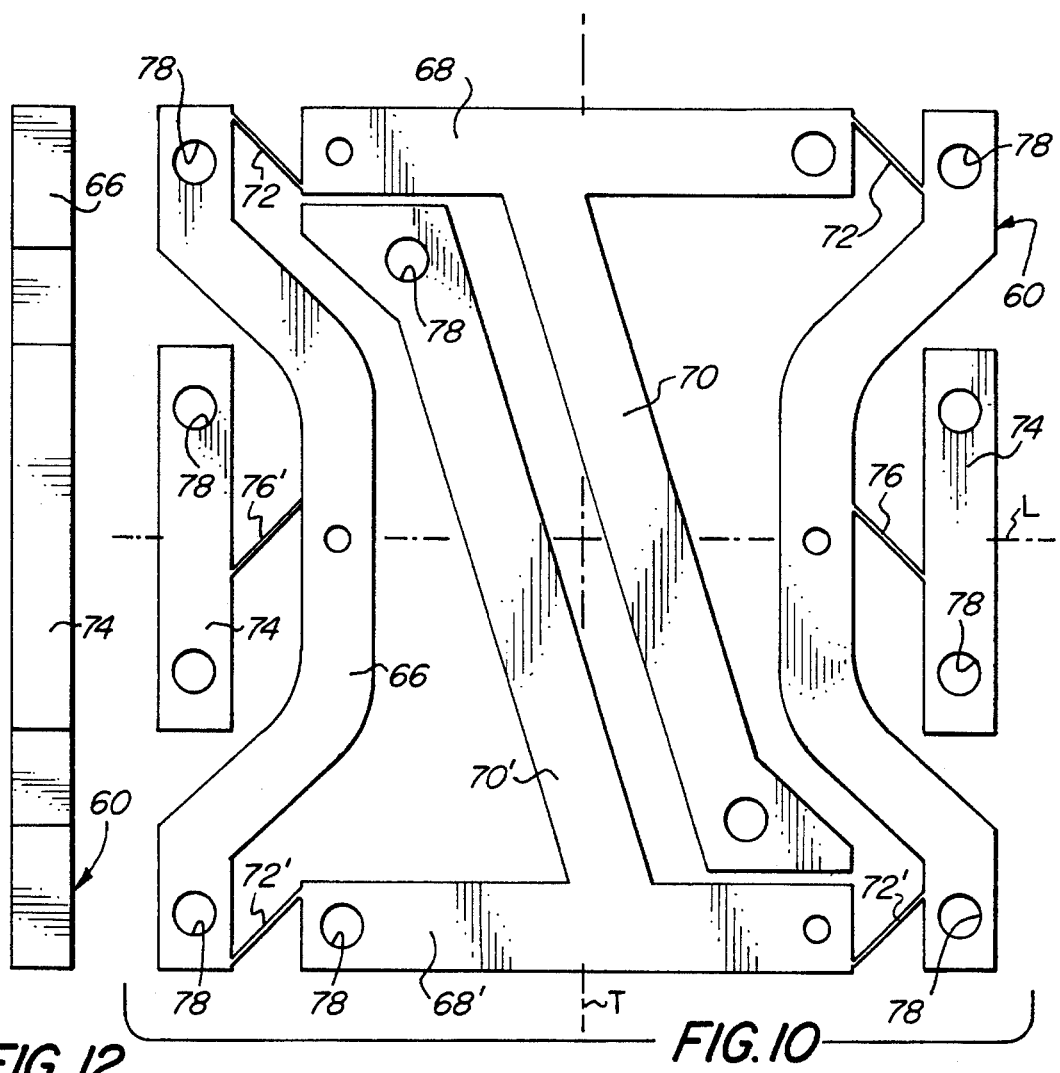
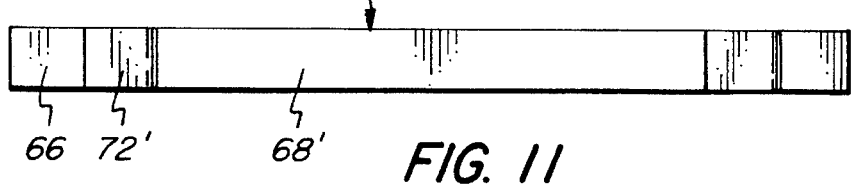
FIG. 12    FIG. 10
FIG. 11

FLEXTURE PLATE MOTION-TRANSFER MECHANISM, BEAM-SPLITTER ASSEMBLY, AND INTERFEROMETER INCORPORATING THE SAME

United States Government has rights in this invention pursuant to Contract No. DE-FG05-92ER81339, awarded by the Department of Energy.

CROSS REFERENCE TO RELATED APPLICATIONS

This application is a continuation-in-part of application for Letters Patent Ser. No. 07/837,622, filed Jan. 6, 1992 and now issued as U.S. Pat. No. 5,349,438, which in turn is a continuation-in-part of application for Letters Patent Ser. No. 07/773,225, filed Oct. 9, 1991 issued as U.S. Pat. No. 5,196,902.

BACKGROUND OF THE INVENTION

Two-beam interferometer spectrometers are well known in the art. Most of the modern spectrometer designs, including the Michelson interferometer spectrometer, are described in Griffiths and DeHasetn, *Fourier Transform Infrared Spectrometer,* John Wiley & Sons, N.Y., Chapter 4, 121–165 (1986).

The Michelson interferometer functions by dividing an incident beam of electromagnetic radiation into two separate beams at a beamsplitter, each of which beams is caused to travel along a different optical path; one of the beams is usually directed along a reference path having a fixed optical length, while the other is simultaneously directed along a path of variable length. A reflecting element, such as a plane mirror or a cube corner or "cats eye" retroreflector, is placed in the optical path of each beam to return it to the beamsplitter, where the beams recombine to form a single exit beam. The optical path length variation, which is typically achieved by moving one of the retroreflectors, causes the combined exit beam to be amplitude modulated due to interference between the recombining beams. By converting the interferogram so obtained into an electrical signal, and by then analyzing that signal in a known manner, the spectrum or intensity of the input radiation can, after suitable calibration, be derived as a function of frequency.

More particularly, when such an interferometer is employed in a Fourier transform spectrometer, the exit beam is focused upon a photoconductive or other detector to produce the electrical interferogram signal. If a sample is so placed that the modulated beam passes through it prior to impinging upon the detector, the analysis performed can determine the absorption spectrum of the sample; other placements of the sample, and other of its characteristics, can be employed and obtained as well.

In those instances in which the optical path length through the interferometer is varied by displacement of a retroreflecting element along the optical axis of the beam, it will be appreciated that the maximum resolution attainable with the instrument is directly related to the maximum path difference that can be produced; i.e., to the maximum longitudinal displacement that is attained by moving the retroreflecting element. Because Michelson interferometers rely upon the wave interference that occurs when the two beams recombine at the beamsplitter, an important factor in determining the quality of such a device is the degree to which the optical elements remain aligned during path-length variation. Accordingly, longitudinal displacement of the moving mirror must be effected with extreme accuracy over the entire range of its travel; i.e., the moving mirror must in most cases remain aligned to within a small fraction of the wavelength of incident light, over a longitudinal displacement of several centimeters. Any irregularity in the mirror guide path, such as might cause even slight tilting of a plane mirror, will lead to significant distortion in the interferogram produced. It is of course well known that substitution of cube-corner and cats-eye retroreflectors for plane mirrors can essentially eliminate such tilting distortion problems; but it is known as well that the use of those elements also entails certain inherent drawbacks.

Precision air bearings and the like have been employed in modern interferometers in an effort to satisfy the extreme accuracy requirements to which movable mirror guides are subject. Such systems are however quite expensive, and moreover they require a supply of pressurized gas for operation. Electronic control systems, with feedback to automatic positioners, have also been utilized as a means for dynamically maintaining mirror alignment; satisfactory self-aligning systems are however difficult to design, and they tend to be relatively large and expensive.

In view of these drawbacks, substantial effort has been devoted to the development of high-quality interferometers that do not rely upon precision bearings or electronic alignment control systems. One approach taken utilizes a tiltable reflector assembly consisting of a pair of parallel, confronting mirrors, rather than a longitudinally displaced retroreflector. As an ostensible improvement thereupon, U.S. Pat. No. 4,915,502, issue on Apr. 10, 1990, teaches a twin-arm interferometer spectrometer having a tiltable reflector assembly by which the optical path lengths of both interferometer beams are varied simultaneously, thereby achieving a desired total path difference by a much smaller rotation of the paired mirrors than would otherwise be required. Such a design affords the advantage of insensitivity to linear movement of the optical element (i.e., only angular displacements will change the path length); moreover, rotating bearings are generally easier and less expensive to produce than are longitudinal or linear ones.

Also of interest is U.S. Pat. No. 4,383,762, issued May 17, 1983, which provides a two-beam interferometer for Fourier spectroscopy in which a rigid pendulum arm is used to mount moving cube corner retroreflectors. The pendulous movement (arcuate oscillation) enables accurate optical path-length variation to be produced in a smoothly guided motion, and the cube corner retroreflectors render the optical system unaffected by the resultant tilt; this avoids the disadvantages for Fourier spectroscopy that are inherent in the deviation from strict linearity that characterizes such pendulous motion.

So-called "porch swing" mounting arrangements are also known in the art, in which structural elements, supported at four pivot points, form a parallelogram by which a mirror, mounted at right angles to one side of the parallelogram, can be translated along an axis that is perpendicular to the mirror's plane. While such designs can provide inexpensive systems in which mounted mirrors are constrained to linear motion, due to the relatively large displacement distances that were deemed necessary they have not heretofore been considered practical for use in instruments in which high resolutions are to be realized.

Pervading all of the foregoing considerations is the need to effectively isolate the mirror-supporting interferometer structure from extraneous forces, which would tend to produce aberrant distortions of the structure, and to thereby introduce inaccuracies into the optical measurements made; such forces will normally arise from environmental vibrational effects, and can of course be of a rotational or translational nature. A similarly pervasive factor concerns the need to so support the beamsplitter, and any associated reflective elements, so as to minimize the effects thereupon of thermal and mechanical forces while enabling precise adjustment for maximum accuracy; the same factors are applicable as well to other parts and components of spectrometers, in addition to the moving reflector and the beamsplitter thereof. Needless to say, considerations of weight, size, facility of use, efficiency, and manufacturing cost and feasibility are also of primary importance.

The above-mentioned application Ser. No. 07/837,622 provides a novel structure for the dynamic support of reflective elements, in which a high degree of immunization against environmental vibration and other extraneous forces is afforded, and in particular immunization against both rotational and translational effects. Despite those and other attributes of the earlier invention, further improvements thereupon would of course be desirable.

SUMMARY OF THE INVENTION

Accordingly, it is a broad object of the invention to provide a novel flexure plate suitable for use in constructing a motion-transfer assembly and mechanism, which plate is of relatively incomplex, one-piece construction.

A more specific object is to provide such a flexure plate which is of highly symmetrical construction, and is adapted for assembly with an identical plate in a mutually inverted relationship, so as to provide such a motion-transfer assembly and mechanism, immunized against the effects of extraneous forces applied thereto.

Other broad objects of the invention are to provide novel motion-transfer assemblies and mechanisms, especially incorporating the flexure plates herein described, and a novel interferometer incorporating such motion-transfer assemblies and mechanisms.

An object related thereto is to provide a support member that may be used in an interferometer, the member having structure thereon by which a reflective component can be supported with a high degree of positional stability while readily accommodating thermal expansion effects.

Another object of the invention is to provide a novel beamsplitter assembly suitable for use in an interferometer, which assembly includes monolithic support structure of incomplex character and having fixed reflective surfaces thereon, together with a beamsplitter component adjustably mounted by the support structure.

A related object is to provide a novel folded-path interferometer incorporating such a beamsplitter assembly.

An additional object of the invention is to provide novel beamsplitter mounting means by which the orientation of the beamsplitter component can readily be adjusted with a high degree of accuracy, and which supports the beamsplitter component with a high degree of stability while readily accommodating thermal expansion effects.

It is another object of the invention to provide a novel optical steering module, which is adapted for use with an interferometer to provide an integrated radiation source, detection unit, and transfer optics for precise prealignment.

A further object is to provide a novel clocking subassembly, adapted for integration with the support structure of the beamsplitter assembly so as to position a monochromatic radiation source and detector in an optimal relationship to the beamsplitter component, and to afford a high degree of stability against thermal effects.

A still further object of the invention is to provide a novel voice-coil type of motor that is especially suited for driving the motion-transfer mechanism of an interferometer, which motor is of relatively low mass and high efficiency.

Yet another object is to provide a novel analytical instrument in which modular systems are employed for facile removal and replacement or substitution, and in which design, configuration and arrangement factors are optimized in respect of the instrument, the systems, and the components thereof, for compactness, thermal and mechanical stability, and facility of manufacture, service, and use.

It has now been found that certain of the foregoing and related objects of the invention are attained by the provision of a flexure plate, integrally formed as a single piece and constructed for assembly with at least one identical plate to provide a motion-transfer assembly. The plate is substantially planar and substantially identical in orientations rotated 180° about an axis normal to its plane. Lateral half-sections are defined in the plate to the opposite sides of a transverse axis extending transversely through the normal axis, and transverse half-sections are defined to the opposite sides of a lateral axis extending laterally through the normal axis and perpendicular to the transverse axis. Each lateral half-section comprises a mounting element and an elongate rocker element interconnected to the mounting element by a flexible connecting element, the latter being so constructed and located as to permit the rocker element to rock about a point on the lateral axis while being constrained to the plane of the plate. Each transverse half-section comprises a support element, the opposite end portions of which are interconnected by a connecting element to the end portions of the rocker elements disposed therewith in the same transverse half-section. This enables the support elements to reciprocate in the plane of the plate along axes that are substantially parallel to the lateral axis, as the rocker elements rock about the indicated points.

The connecting elements will preferably comprise spring elements joined at their opposite ends to the mounting, rocker and support elements, each spring element extending obliquely to the lateral and transverse axes. In especially preferred embodiments: the spring element interconnecting the mounting and rocker elements in one of the lateral half-sections will be directed oppositely to the corresponding spring element in the other lateral half-section; the spring element connecting one end portion of one of the support elements disposed in the "one" lateral half-section will be directed like the spring element connecting the opposite end of the "one" support element disposed in the other lateral half-section; and the spring elements connecting the "one" support element will be directed oppositely to the spring elements connecting the other support element.

The plate will usually have a generally rectangular overall configuration, with connecting elements interconnecting the rocker and support elements disposed substantially at the corners. The rocker elements may, in such a case, be so configured that each has an intermediate portion disposed laterally inwardly of its end portions, with each of the mounting elements lying laterally outwardly of the intermediate portion of the rocker with which it is interconnected.

Other objects of the invention are attained by the provision of a motion-transfer assembly comprised of at least two substantially identical flexure plates, constructed as herein described and assembled with one another. More particularly, the plates are assembled in face-to-face, 180° inverted relationship with the lateral and transverse axes of one of the plates mutually coincident with the lateral and transverse axes of the other plate. As a result, pairs of confronting spring elements cooperatively form a multiplicity of cross-spring pivot members, each defining a dynamic pivot point (i.e., a point that moves as the assembly is flexed) at the intersection of the spring elements of which it is comprised; the pairs of mutually confronting mounting elements, rocker elements, and support elements are joined to one another to cooperatively provide, respectively, mounting members, rocker members, and support members.

Additional objects are attained by the provision of a motion-transfer mechanism comprising a pair of the assemblies described, spaced from one another in confronting relationship, each assembly comprising transverse half-sections defined to the opposite sides of the coincident lateral axes of the flexure plates from which it is constructed. Two bodies span the mechanism, each being supported by one of the support members of each assembly, the bodies being so constructed as to dispose the center of gravity of each transverse half-section of the mechanism (which half-sections are of equal mass) to the side of the plane that includes the lateral axes opposite to the side on which the corresponding support member is disposed, thereby immunizing the mechanism against effects of extraneous forces.

Normally, the supported bodies will extend between the assemblies in spaced, laterally aligned relationship with one another. At least one reflective element will be mounted on one of the bodies, with its center of gravity disposed substantially on a central axis midway between, and parallel to, the coincident lateral axes of the assemblies. The mechanism may further include drive means for effecting reciprocating translational movement of the reflective element, at least one component of the drive means being attached to each of the bodies with its center of gravity also disposed substantially on the central axis. In such a mechanism, the mass and configuration of the components will advantageously be such as to dynamically and statically balance one another irrespective of the orientation of a common axis between the bodies, to thereby immunize the mechanism against extraneous forces.

A unique feature of the mechanism resides in so constructing the "one" body as to comprise a body portion and a hollow mounting portion extending outwardly from the body portion and integrally formed therewith as a single piece, or unit. The mounting portion will in turn comprise a generally circular wall of such thickness as to impart thereto rigidity in the direction of the axis of the wall coupled with flexibility in planes to which the axis is normal, the reflective element being affixed to the wall and seated therewithin. As will be appreciated, this construction affords a high degree of positional stability to the reflective element, while permitting the wall to readily accommodate dimensional changes produced as a result of thermal effects. In preferred forms, the wall of the reflector-mounting portion will be of outwardly flaring frustoconical configuration, and the reflective element will be a cube-corner retroreflector. The retroreflector will be seated within the space defined by the wall, with its corner directed toward the body portion and with attachments therebetween being provided at a plurality of mutually proximate locations on the periphery of the retroreflector and on the circumference of the wall.

Another unique feature of the instant mechanism concerns the drive means that is preferably employed, which comprises a voice-coil motor that includes a hollow, electric coil component mounted on one of the bodies, and a permanent magnet component mounted on the other body. The permanent magnet component will include a core element telescopically received within the coil component and dimensioned and configured for relative reciprocal movement substantially on the above-mentioned common axis of the mechanism, and at least one pair of leg elements spaced to opposite sides of the core element and extending parallel to it. Each leg element will carry a permanent magnet element, the magnet elements being so arranged as to produce magnetic flux through the adjacent side portions of the core element, the fluxes being of equal magnitude and opposite direction so as to balance the magnetic forces applied thereby to the opposite portions of the coil. The inside dimensions of the coil component, the outside dimensions of the core element, and the spacing of the leg elements from the core element will be such as to permit free relative movement of the coil component and the magnet component, while minimizing gaps therebetween so as to maximize flux efficiency.

Most desirably, both the coil component and the core element will have uniform rectangular cross sections in all planes taken along their entire effective lengths. The inside dimensions of the coil component will be somewhat greater than the outside dimensions of the core element, taken on axes perpendicular to transverse axes extending between the magnet elements, so as to provide sufficient spacing to accommodate a small degree of displacement of the core element within the coil component in the direction of the perpendicular axes. The structure by which the bodies are supported will cause them to undergo a slight degree of shear, or arcuate deviation from strict rectilinear translatory movement, in the perpendicular direction and away from the common axis to which their movement is substantially constrained.

Further objects of the invention are attained by the provision of a beamsplitter assembly, comprising a one-piece, integrally formed body having opposite sides and a generally medial plane therebetween, an opening extending through the body on an axis substantially normal to the medial plane, and laterally aligned, optically flat planar surface portions on the opposite sides of the body. The surface portions lie adjacent the opening through the body, and converge away from the opening at an acute angle to the plane. Mounting means is disposed within the opening of the body for mounting a beamsplitter substantially parallel to the medial plane, with the mounting means and the body having coacting elements that provide means for adjusting the orientation of the beamsplitter.

The planar surface portions on the body will normally be of specular reflectance, and the angle of convergence (taken with reference to the bisecting plane) will desirably have a value of about 25°. The beamsplitter mounting means will advantageously comprise a frame disposed generally parallel to the medial plane of the body and including a peripheral part and a plurality of resiliently deformable elements, the latter being attached to the peripheral part for yieldingly engaging the periphery of a beamsplitter component. Preferably, the mounting frame will be integrally formed as a single piece, with the deformable elements being elongated and attached at their opposite ends to the peripheral piece.

A unique clocking subassembly may be incorporated into the beamsplitter assembly, and will include a support piece fabricated from the same material as the one-piece body, and affixed thereto. A monochromatic radiation source, a detector responsive thereto, and optics for directing radiation from the source along a path toward the detector are operatively disposed on the support piece; the subassembly is so constructed and affixed as to operatively dispose the beamsplitter of the beamsplitter assembly in the path of the monochromatic radiation.

Yet additional objects of the invention are attained by the provision of a spectrometer system, which includes an interferometer module and an adjacent, self-contained optical steering module. The steering module will comprise a body having means for holding an analytical radiation source element, and having an analysis beam detector thereon and first and second optical means for transferring radiation. The "first" optical means will be constructed and arranged to transfer radiation into the interferometer module and from the interferometer module outwardly of the steering module; the "second" optical means will be constructed and arranged to collect radiation from outwardly of the steering module and to direct it upon the analysis beam detector.

The means for holding the radiation source element will normally comprise a cavity within the steering module body, which body may have a wall with apertures for the exit and entrance of radiation from an into the "first" and "second" optical means, respectively. The spectrometer may also include an analysis cell, comprised of an enclosure with a wall having input and output windows. The wall of the enclosure will be disposed adjacent the wall of the steering module body, with the exit and entrance apertures of the latter in optical alignment with the input and output windows of the former, for the passage of radiation therebetween.

BRIEF DESCRIPTION OF THE DRAWINGS

FIG. 9 is a fragmentary diagrammatic elevational view taken along line 9—9 of FIG. 2, showing the clocking subassembly of the beamsplitter assembly, and its relationship to the beamsplitter component;

FIG. 10 is a plan view of a flexure plate employed in the motion-transfer mechanism of the instant invention;

FIG. 11 is an edge view of the plate of FIG. 10, taken along one side thereof;

FIG. 12 is an edge view of the plate of FIG. 10, taken along one end thereof:

DETAILED DESCRIPTION OF THE ILLUSTRATED EMBODIMENTS

Figure 1:
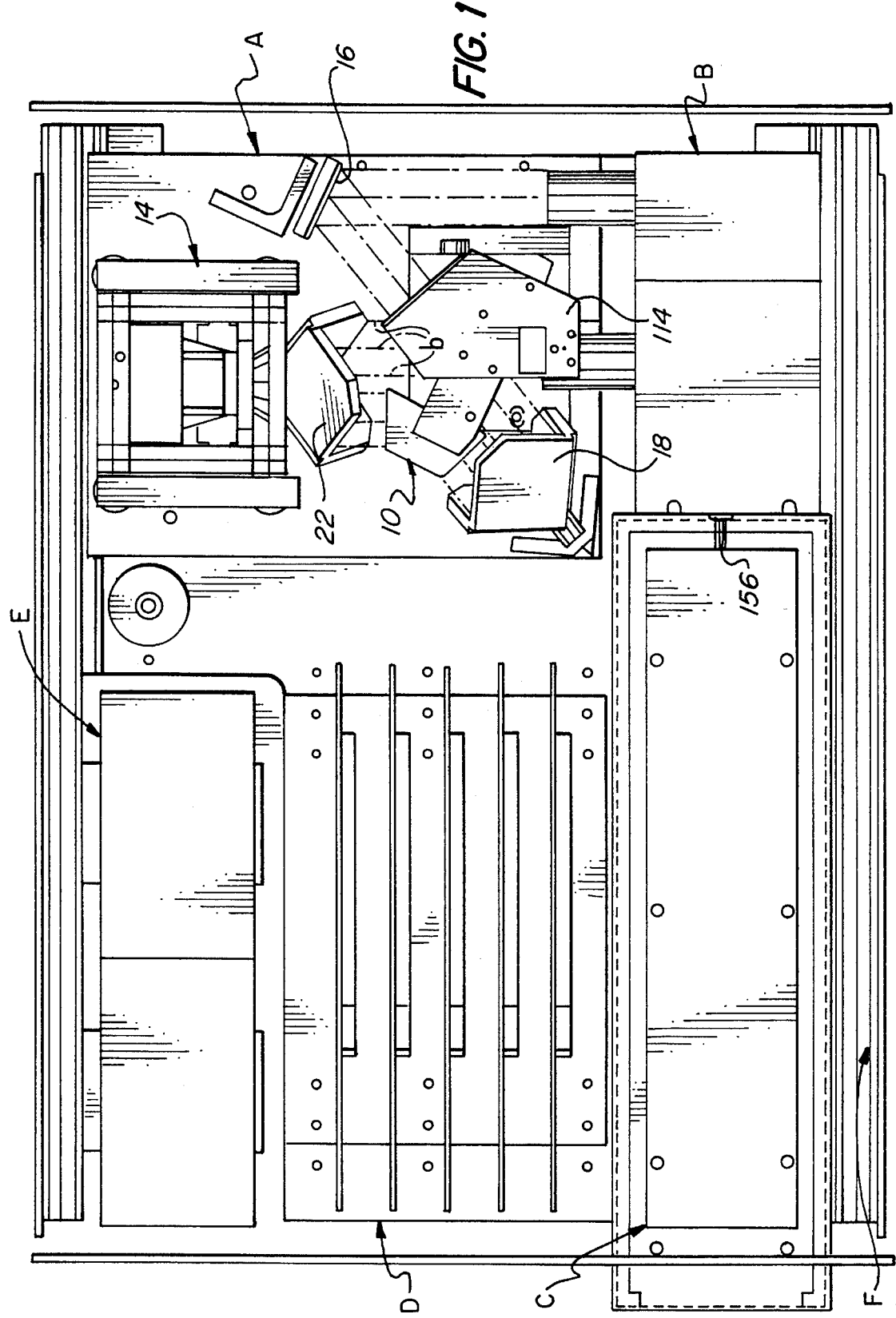
FIG. 1 is a plan view showing an integrated Fourier transform spectrometer and gas analysis cell embodying the present invention, the instrument cover being removed to expose the modules and components of which it consists.

Turning initially to FIG. 1 of the drawings, the gas analysis system shown is unique in comprising a spectrometer modulator module A, an optical steering module B, and an optical analysis gas cell C, compactly assembled on a common chassis F with a printed circuit board cage D and a power supply and electronic date-processing unit E. The modules are kinematically supported as appropriate, and may readily be removed from the instrument for service, adjustment, etc.

Figure 2:
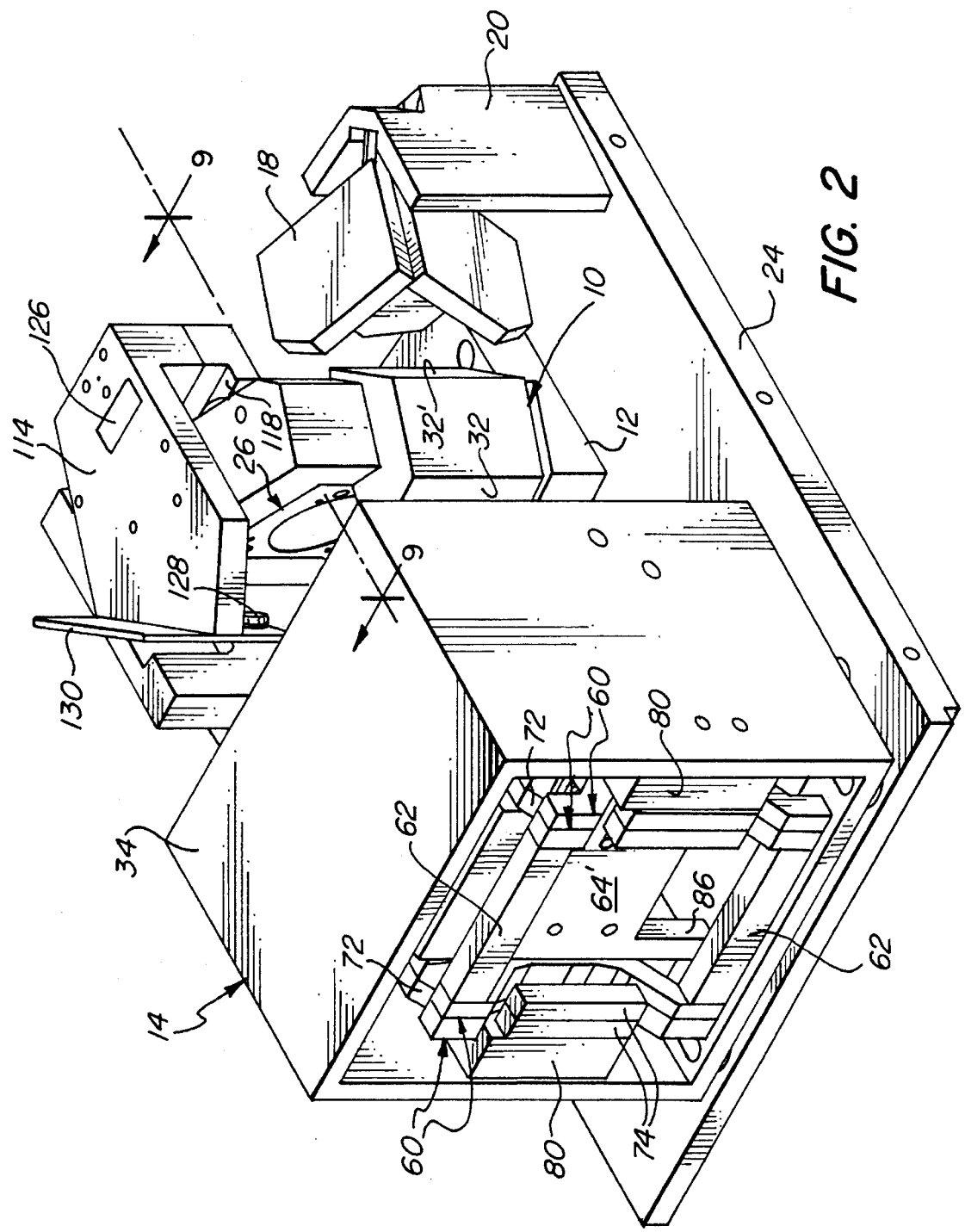
FIG. 2 is a perspective view of a modulator module, including a two-arm interferometer embodying the present invention.
Figure 3:
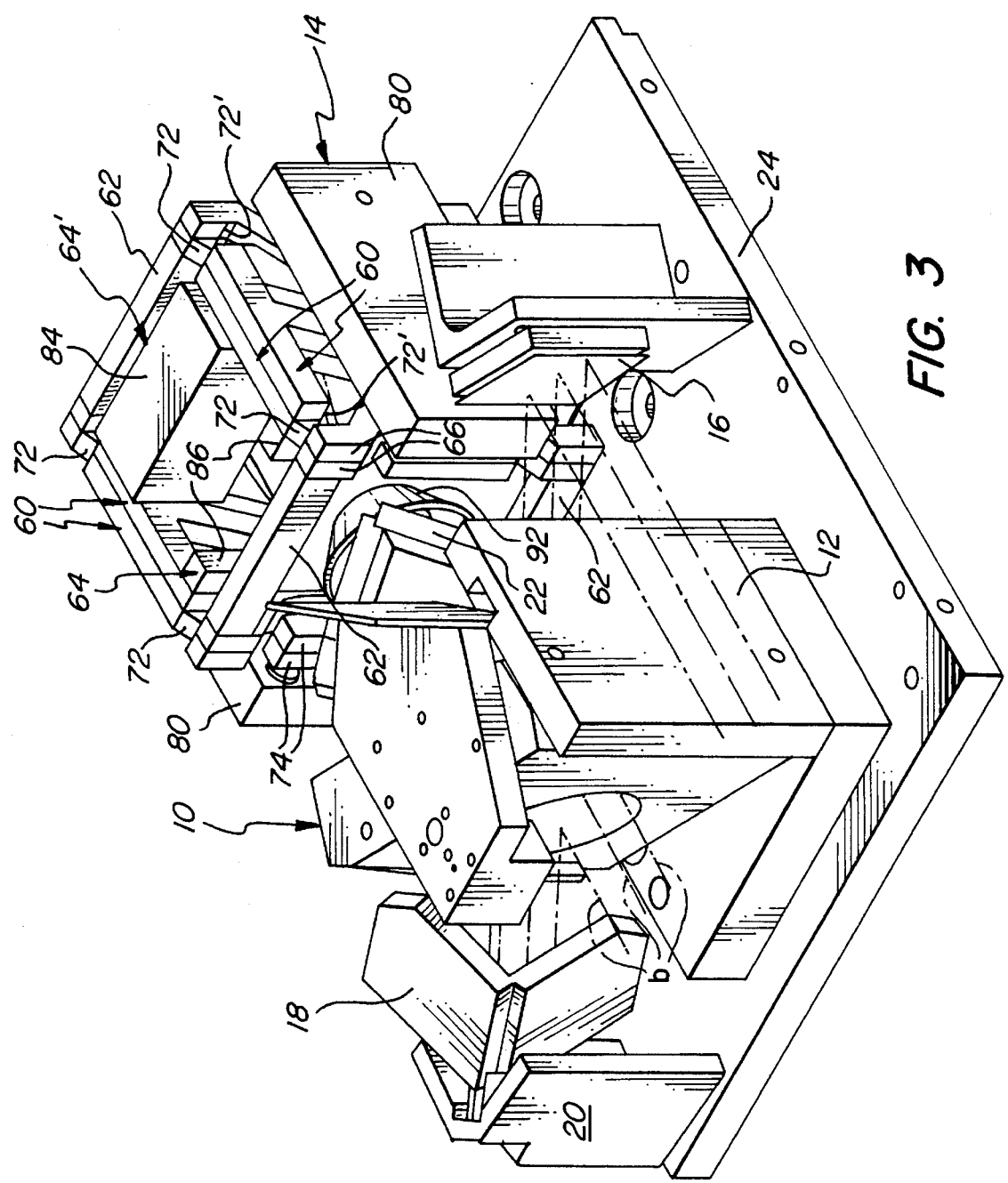
FIG. 3 is a perspective view of the module of FIG. 2, taken from a second direction (displaced 180° from the first) and showing the enclosure removed from the motion-transfer mechanism of the interferometer.
Figure 4:
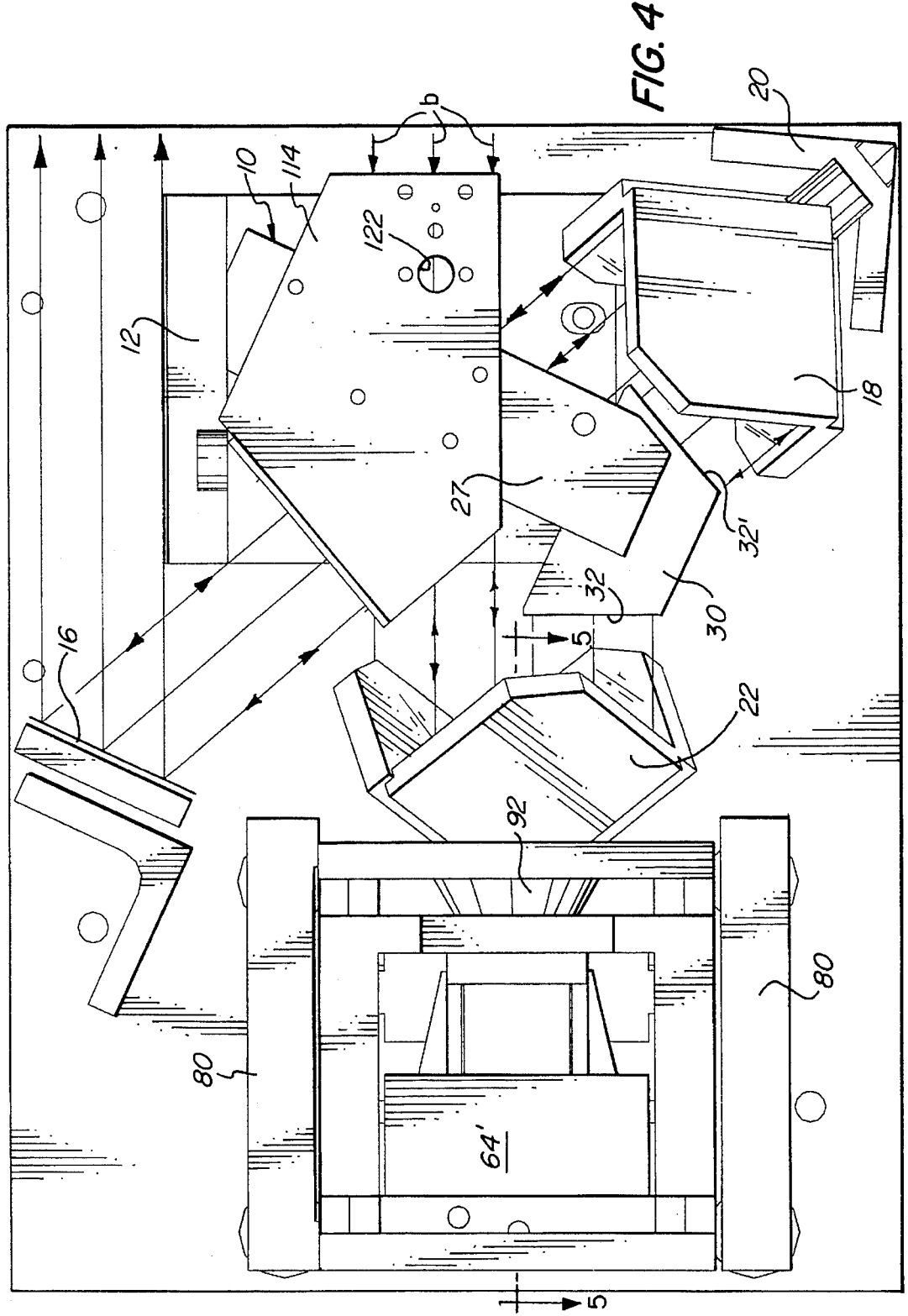
FIG. 4 is a plan view of the module of the preceding two Figures.

FIGS. 2 through 4 of the drawings depict an interferometer, consisting of a beamsplitter assembly, generally designated by the numeral 10 and mounted upon an L-shaped base 12, a motion transfer or articulator mechanism, generally designated by the numeral 14, a plane mirror 16, a first cube-corner retroreflector 18 fixedly supported on upstanding wall structure 20, and a retroreflector 22 movably supported on the mechanism 14; the components of the interferometer are assembled in fixed relative positions on the mounting board 24.

Figure 7:
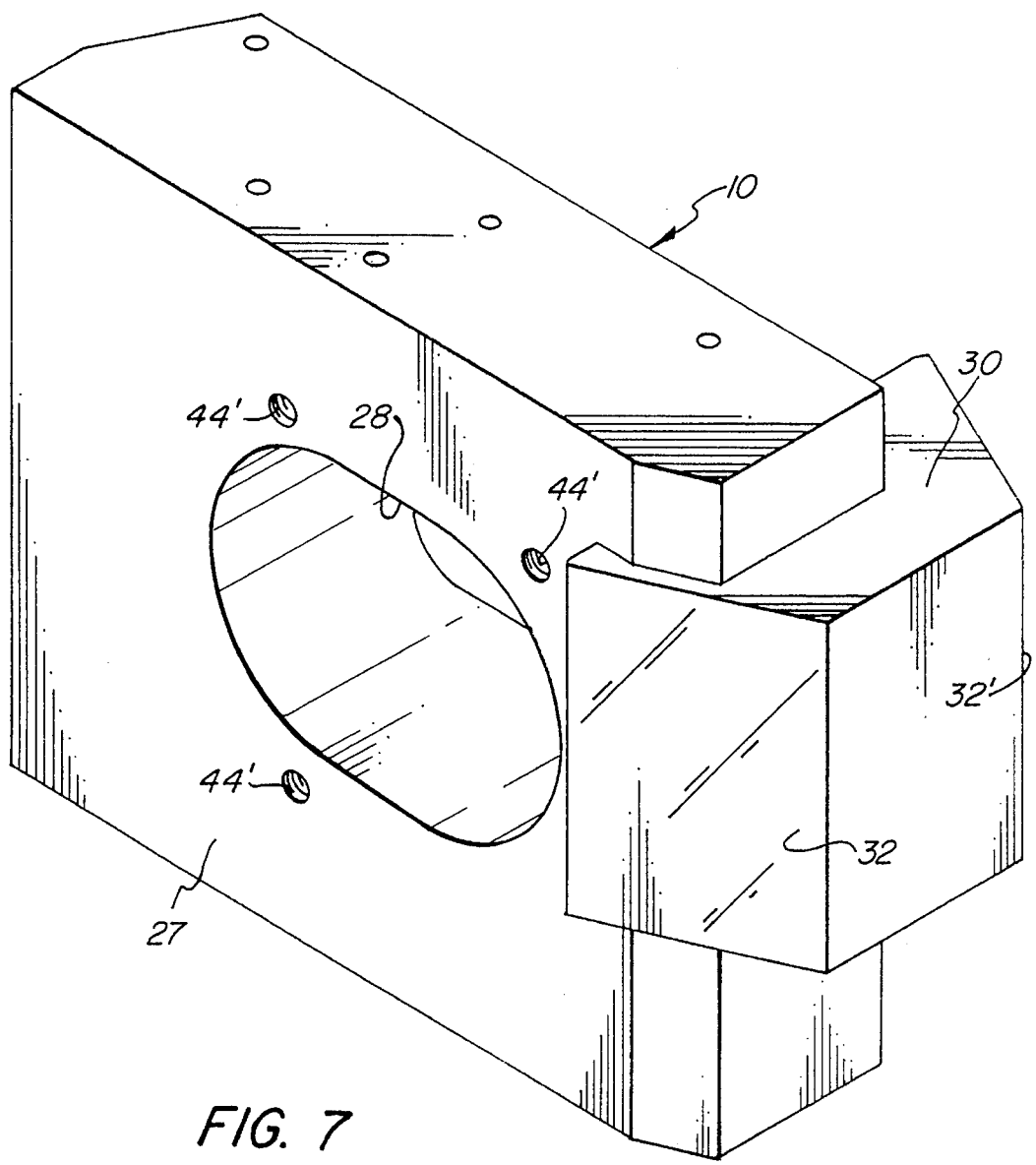
FIG. 7 is a perspective view of the monolithic body of the beamsplitter assembly employed in the interferometer.

With additional reference to FIG. 7, the integrally formed beamsplitter assembly 10 is seen to comprise a body 27 having an opening 28 formed therethrough and a head portion 30 thereon; the opening 28 is of straight-sided oval cross section, to permit passage of radiation beams "b" without interference. The head portion 30 comprises planar surfaces 32, 32', disposed to the opposite sides of the body 27 and converging at an angle of about 25° to a medial plane that bisects the angle between the surfaces. The body 27 may be of aluminum fabrication, with the surfaces 32, 32' machined thereon, as by diamond machining, so as to render them of highly precise optical character; replication techniques may also be employed to great advantage for fabrication of reflective surfaces. A unique beamsplitter cartridge, generally designated by the numeral 26 and to be more fully described hereinbelow, is seated in the opening 28.

As will be appreciated, and as is schematically shown by the beams "b" collimated radiation from a radiation source is directed onto a beamsplitter mounted in the body opening 28. One component of the incident beam passes through the beamsplitter to the moving cube-corner retroreflector 22, being reflected internally thereof to impinge upon the surface 32, and being reflected thereby along the original path to the beamsplitter. A second component of the beam is reflected by the beamsplitter upon the fixed retroreflector 18, being internally reflected to impinge upon the plane mirror 32' on the opposite side of the head portion 30, from which it too is reflected back to the beamsplitter along its original path. The beam components of course recombine and are reflected by the plane mirror 16 to exit the interferometer.

Figure 8:
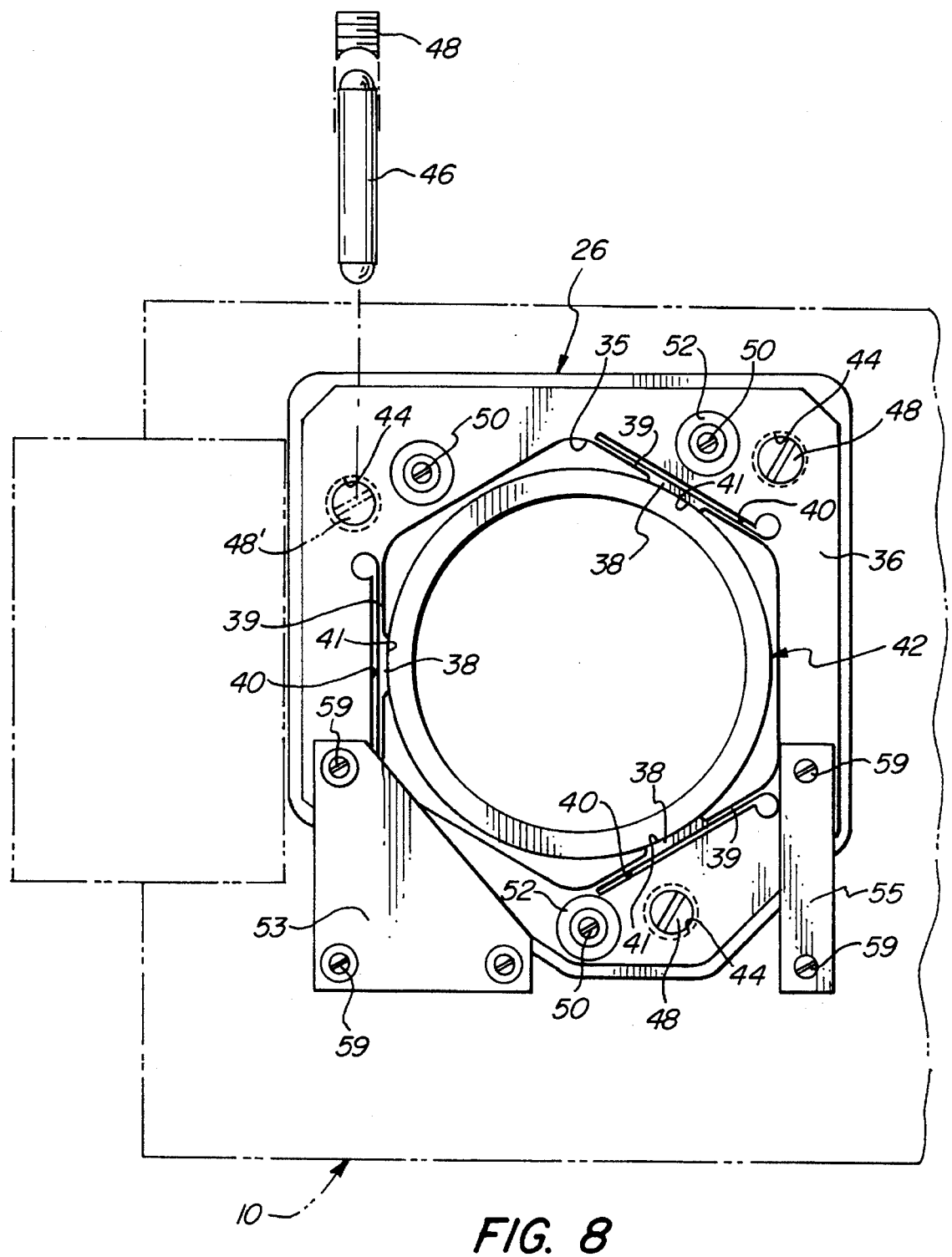
FIG. 8 is an elevational view of the beamsplitter cartridge, fragmentarily showing the body of the beamsplitter assembly in phantom line.

FIG. 8 shows the frame 36 of the beamsplitter cartridge 26, and one of the discs of a compensated beamsplitter, generally designated by the numeral 42. As can be seen, the frame 36 is formed with a hexagonal opening 35, triangularly bordered by engagement portions comprised of elongate beam elements 39 integrally formed by machining slots 40 (e.g., by an EDM technique) into the frame 36, the elements 39 being attached to the peripheral part at their opposite ends. A boss 38 is formed centrally on each beam element 39, and has an arcuate recess 41 in which is engaged a circumferential portion of the beamsplitter disc 42, thereby securely but yieldingly mounting the beamsplitter within the opening 35, to accommodate thermal effects without deviation from precise optical alignment and orientation.

Three threaded apertures 44 are formed about the opening 35 at triangulated locations, and serve to seat ball-jointed adjustment rods 46, one of which is shown in exploded relationship. Each rod 46 is engaged at its opposite ends by mating set-screws 48, 48', the screws 48 being threaded into the apertures 44 and the screws 48' being threaded into apertures 44' formed in the body 27. Thus, the rods and screws 46, 48, 48' coact to enable precise orientation of the beamsplitter discs, on three equiangularly spaced axes, relative to the medial plane of the body 27. It is anticipated that piezo-electric stacks may advantageously be substituted for the rods 46. In any case, because adjustment for alignment of the optical components of the interferometer is achieved at the beamsplitter, the folding mirrors 32, 32' can be formed directly upon the head portion 30 of the beamsplitter assembly. Preload screws 50, cooperating with underlying cushioned washers 51, maintain the cartridge 26 in assembly with the body 27. Flexible connecting webs 53 and 55 are secured to the peripheral part by screws 59, and serve to constrain the cartridge against three degrees of movement (i.e., the triangular web 53 constrains it laterally on two perpendicular axes, and the strip 55 prevents rotation).

Turning again to FIG. 3 (in which the enclosure 34 has been removed from the transfer unit 14), it can be seen that two balance bodies, generally designated by the numerals 64 and 64', are supported on each side by an assembly of two flexure plates, generally designated individually by the numeral 60. As is also best seen in FIG. 3, four plates 60 are employed, being assembled as pairs in face-to-face, inverted relationship to one another. The assemblies are spaced from one another by four crosspieces 62 fixed at the corners of the mechanism, and are supported by end blocks 80 which are, in turn, rigidly attached to the mounting board 24.

The flexure plates 60 are shown in detail in FIGS. 10 through 12; each is integrally formed as a single piece, and will desirably be of titanium or aluminum fabrication. Apertures 78 are provided to enable assembly of the several elements to the cross pieces 62, the balance bodies 64, and the supporting end blocks 80. The plates are so configured that all elements thereof coincide in the inverted relationship, with the connecting elements thereof crossing one another to define pivot points; it is a unique feature of the invention that identical plates can be assembled to create those points.

As can be seen in FIG. 10, the flexure plates 60 are of generally rectangular overall configuration, and are substantially symmetric with respect to two perpendicular axes; i.e., laterally extending axis "L" and transversely extending axis "T". Lateral half-sections of the plate are defined to the opposite sides of the transverse axis T, and transverse half-sections are defined to the opposite sides of the lateral axis L. Each lateral half-section comprises a bow-shaped rocker element 66 and a rectilinear mounting or ground element 74; each transverse half-section comprises a support element consisting of a rectilinear, laterally extending component 68, 68' and an oblique component 70, 70' that extends from a central location inwardly of the plate.

The rocker elements 66 are connected to the mounting elements 74 by flat spring elements 76, 76', which extend in opposite directions obliquely with respect to the perpendicular axes L, T; other forms of spring elements (such as those having concave opposing surfaces, as described in the above-identified parent application) may of course be employed, if preferred. The spring elements 76, 76' permit the elements 66 to rock about the mounting elements 74, constrained in the plane of the plate. Similarly, the components 68, 68' are connected by spring elements 72, 72' to the opposite end portions of the rocking elements 66. Accordingly, the components 68 will be constrained to shift reciprocally, on axes parallel to the lateral axis L and in opposite directions, when the elements 66 are caused to rock in the manner described.

It will be noted that both of the spring elements 72 extend in the same oblique direction, as do the elements 72', and that the direction of the elements 72 is opposite to that of elements 72'. It will also be noted that the oblique components 70, 70' of the support elements extend parallel to one another, and are attached to the respective components 68, 68' in the same relationship to the transverse axis T. Consequently, all elements and components of the plates will coincide when two plates are assembled in a mutually inverted relationship. The mounting, rocker, and support elements of the two plates will in fact be coextensive with one another; but because of the opposite orientations of the connecting elements 72 relative to elements 72', and of the connecting elements 76 relative to elements 76', they will cross one another where they coincide and thereby cooperatively define a single, approximate pivot point at each intersection. The members cooperatively formed by the confronting mounting elements 74 serve for attachment of each assembly to the end blocks 80, and thereby for support of the entire mechanism.

Figure 13:
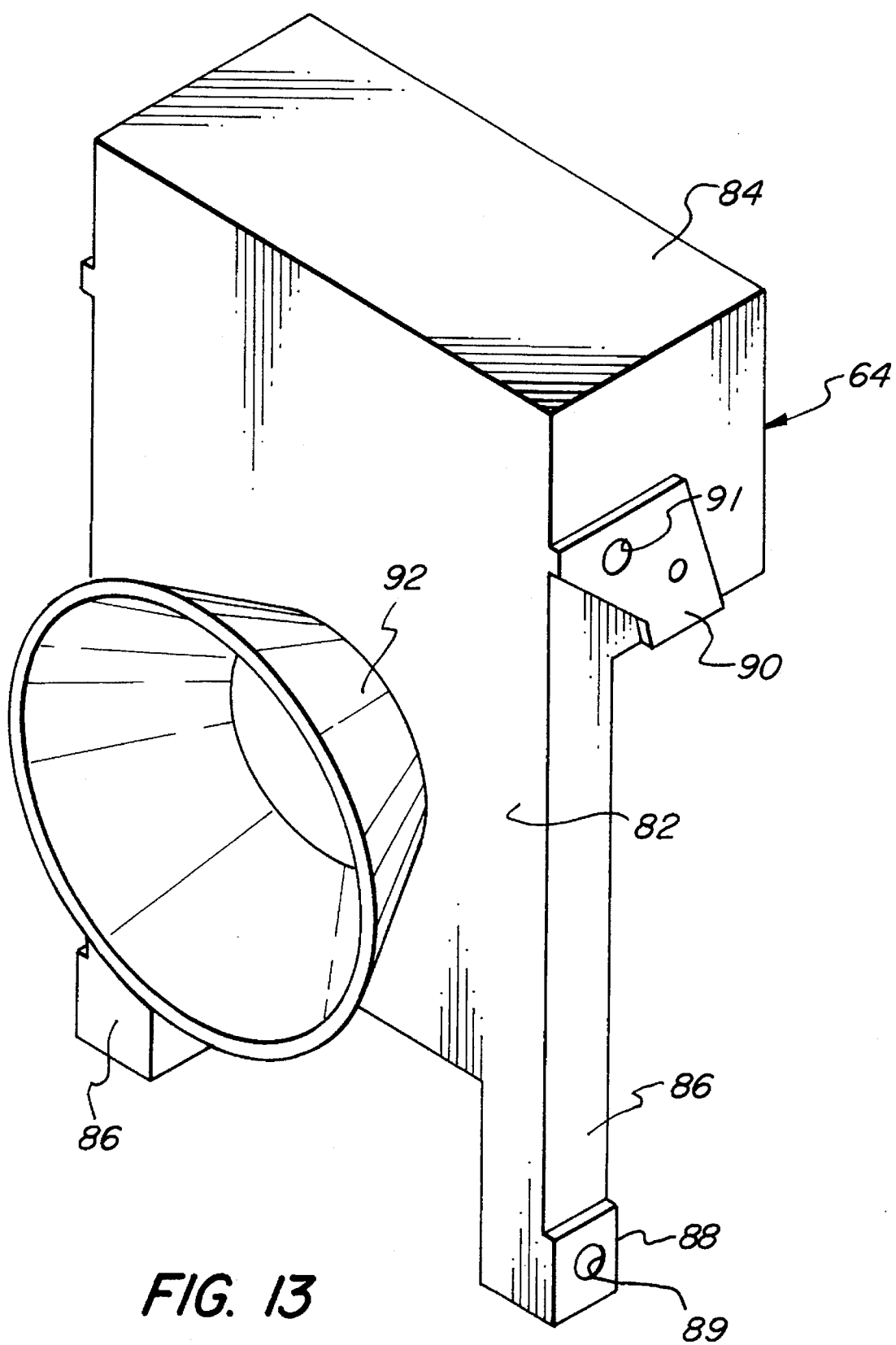
FIG. 13 is a perspective view of one of the balance bodies utilized in the instant motion-transfer mechanism, wall structure being integrally formed thereon for mounting of a retroreflector.
Figure 14:
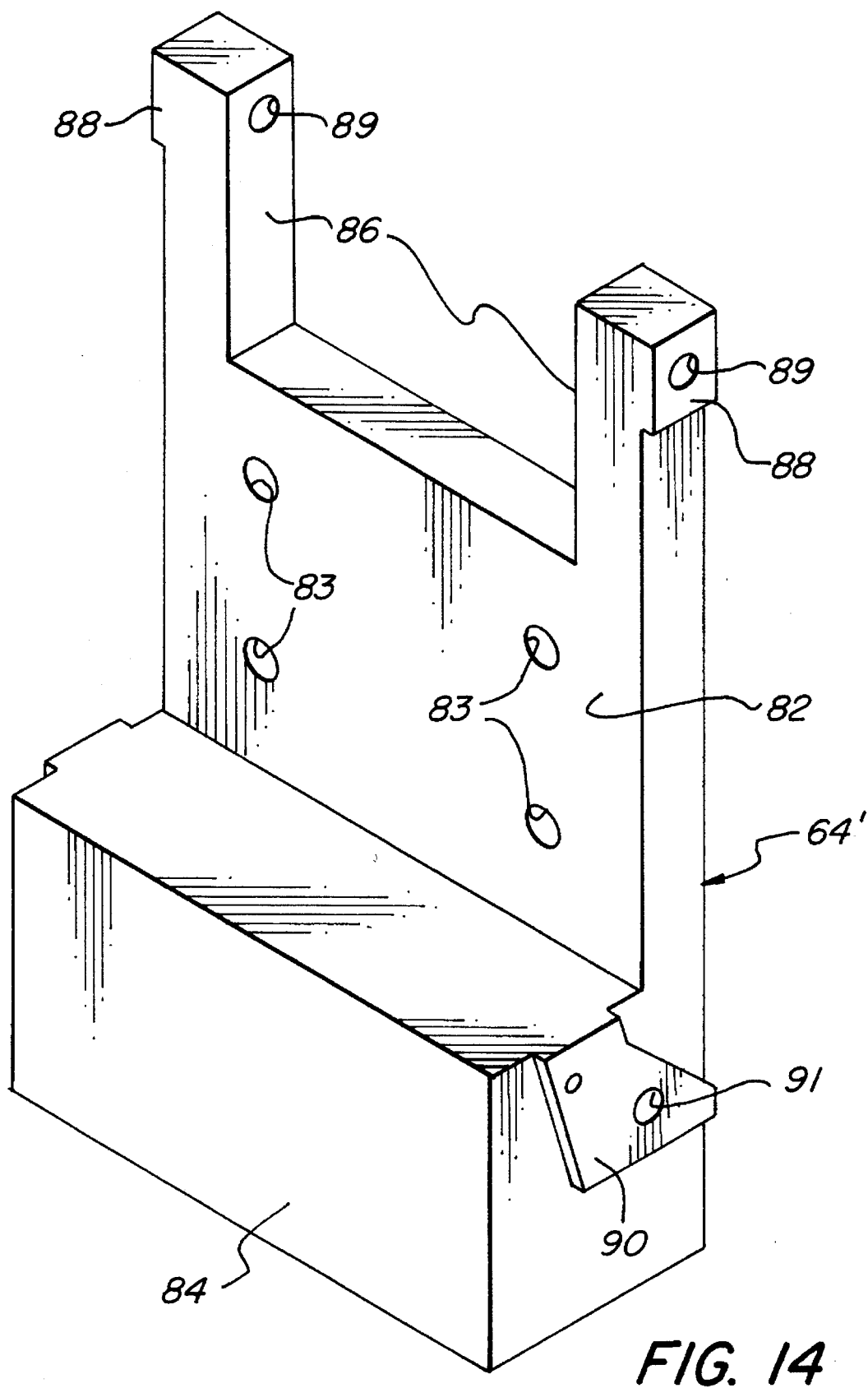
FIG. 14 is a perspective view showing the other balance body of the motion-transfer unit.

The balance bodies 64, 64' employed in the transfer mechanism are shown in greatest detail in FIGS. 13 and 14. Each consists of a central panel 82 having an enlargement 84 at one end and a pair of legs 86 at the other end. Rectangular spacer elements 88 are formed about apertures 89 at the free ends of the leg portions 86, and spacer elements 90, configured similarly to free ends of the oblique components 70 of the flexure plates 60, are formed about the apertures 91. The elements 88 space the leg portions 86 from the support element components 68, 68' of the abutting plates 60, attached and assembled as pairs; the elements 90 serve the same function with respect to the oblique components 70.

In assembly, it will be appreciated that the body 64 may be attached to the oblique components 70' and the laterally extending components 68' of pairs of plates 60, such that the enlargement 84 is upright, and that the body 64' may be attached in inverted relationship to the components 68 and 70, using of course suitable fasteners extending through the apertures 78, 89 and 91. Thus, although the heavy enlargement 84 is upwardly disposed the body 64 is supported from below, and vice versa with respect to the body 64'. These relationships are depicted in FIGS. 5, 6, 13 and 14, and with the plates oriented as shown in FIG. 10. If preferred, however, the relationships may be reversed, as shown in FIGS. 1 through 4. It should be appreciated moreover that the interferometer of the invention may be constructed for use in virtually any orientation, due to the center of gravity shifting, and the resultant balance characteristics, of the support system employed.

A frustoconical wall or collar 92 is provided on the panel 82 of the body 64, and serves to seat the cube-corner reflector 22 and affix it in place. The wall 92 is integrally formed as a single piece with the panel 82, and affords excellent stability in the axial direction while enabling differential expansion of the cube-corner in planes transverse thereto. The body 64' is of similar construction to body 64; the apertures 83 in its panel 82 serve to receive fasteners for supporting a component of the motor that is employed to effect movement of the transfer mechanism, as will be described below. It should be noted however that the collar 92 and the motor mounting means are both so disposed as to position the cube-corner reflector 22 and the motor on an axis lying in the plane of the lateral axes L of the assembled flexure plates, and parallel thereto, so as to distribute the weight of the supported components equally and thereby to render them of no effect upon the inertial balance afforded by the transfer mechanism.

Figure 5:
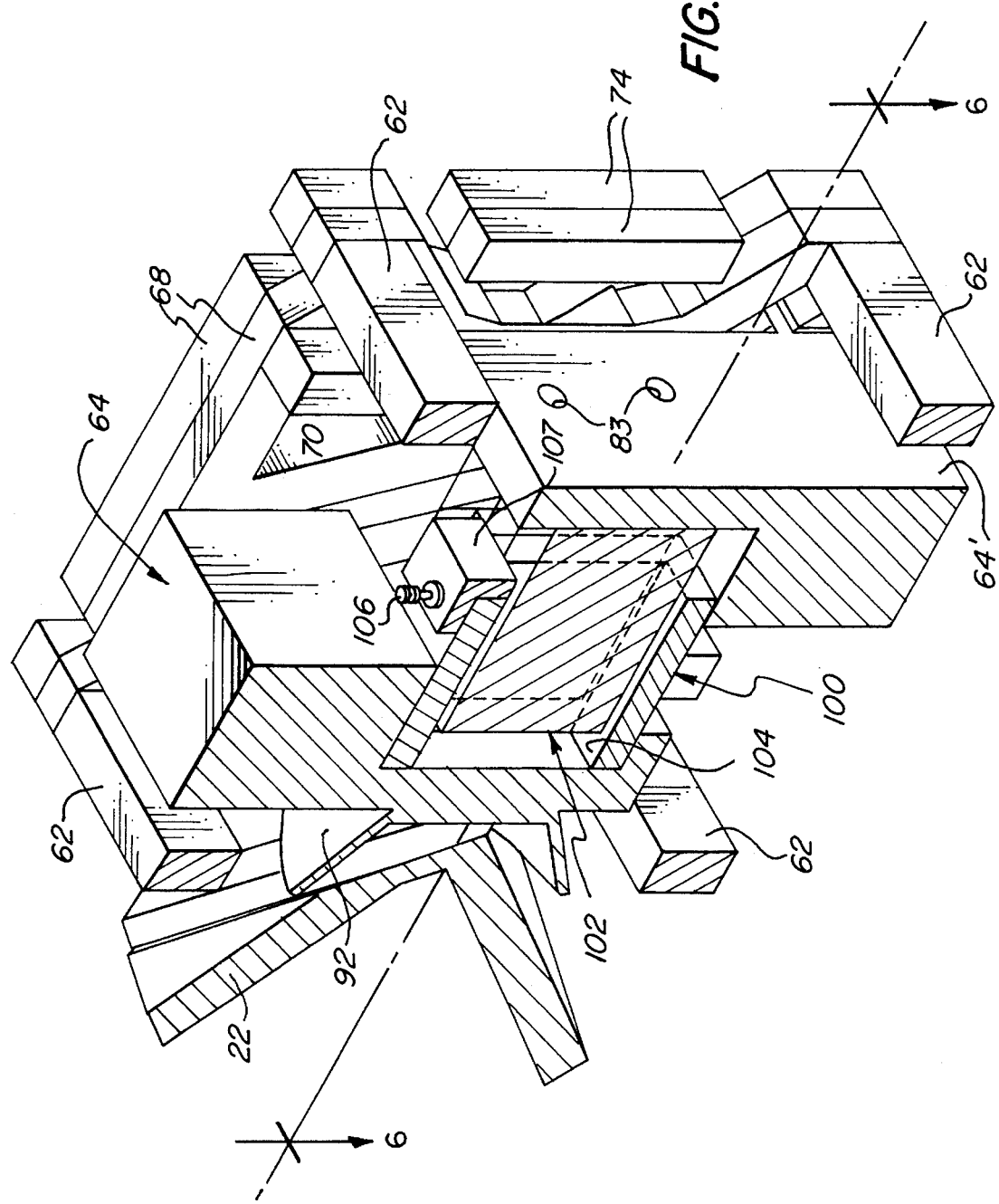
FIG. 5 is a perspective sectional view of a somewhat modified transfer mechanism (as hereinafter pointed out), taken on its median plane along line 5—5 of FIG. 4.
Figure 6:
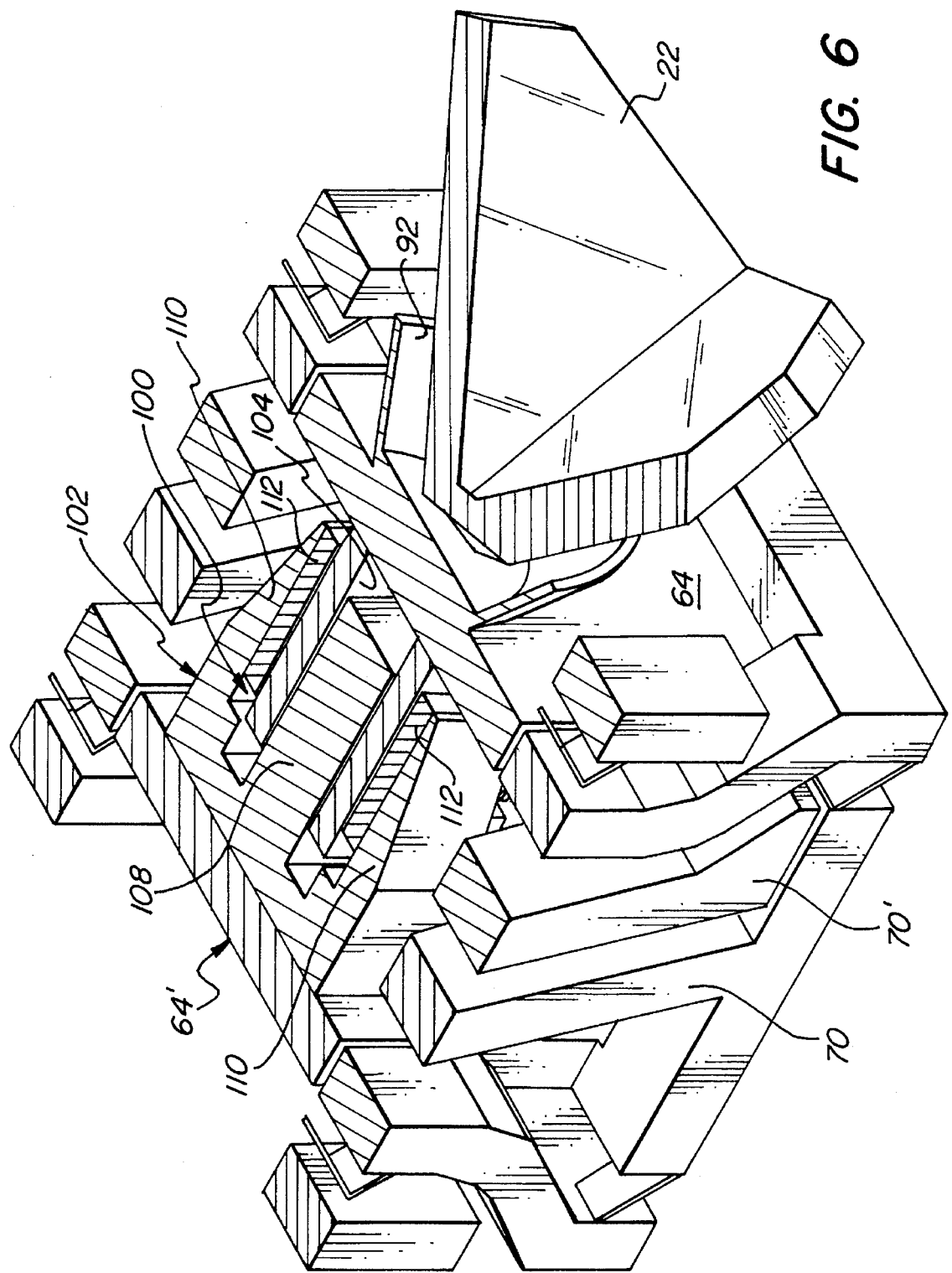
FIG. 6 is a perspective sectional view of the transfer mechanism, taken on its orthogonal median plane along line 6—6 of FIG. 5.

FIGS. 5 and 6 show the voice-coil drive motor in considerable detail, while somewhat diagrammatically illustrating the motion-transfer mechanism (more so in FIG. 6 than in FIG. 5). As can be seen, the motor consists of a coil component and a magnet component, generally designated respectively by the numerals 100 and 102. The coil component 100 is affixed behind the panel 82 of the body 64, and has a passage 104 therethrough which is of rectangular cross-sectional configuration; electrical contact elements 106 (only one of which is seen) are provided on a support element 107. The magnet component 102, attached to the body 64', consists of a core element 108 and a pair of spaced leg elements 110, the latter having permanent magnet elements 112 secured to their inside surfaces. The core element 108 is also of rectangular cross-sectional configuration along its length, and is dimensioned for free axial movement within the rectangular passageway 104 of the coil component 100.

It will be noted that the gaps between the inside surfaces of the coil component 100 and the outside surfaces of the core element 108 are relatively large in the section shown in FIG. 5, and are relatively small in the orthogonal section shown in FIG. 6. The small gap affords high magnetic efficiency. The larger gap permits a small degree of relative movement between the coil component 100 and the magnet component 102, in the plane depicted in FIG. 5, as is necessary to accommodate deviation from strict rectilinearity of movement, due to the slight arcuate motion imparted by the support system.

A unique feature of the illustrated motor resides in the external positioning of the permanent magnet elements 112, which enables significant weight reduction and affords self-evident benefits. The magnet elements 112 are arranged with the same poles facing one another (e.g., N to N), so as to produce equal fluxes in opposite directions and thereby to subject the coil to balanced forces.

FIG. 9 illustrates the laser subassembly used for clocking of interferometer reflector movement, as is of course essential for obtaining the frequency domain information necessary to spectrometric analyses. The clocking subassembly consists of a mounting plate 114 rigidly attached to the body 27 of the beamsplitter assembly, from which depends a bracket 116 having a reflector bar 118 attached to its lower end; a parabolic reflective surface 120 is provided along the inner edge of the bar 118. It should be noted that the components 114, 116 and 118 are desirably formed of the same material as monolithic body 27, to thereby enable optimal thermal-response properties. An aperture 122 in the plate 114 receives a laser diode 124, the radiation from which passes out of the lower end of the aperture to impinge upon the reflective surface 120; the upper end of the aperture 122 is closed by a small covering strip 126 (not shown in some Figures). A detector 128, responsive to the frequency of the radiation from the laser diode 124, is mounted upon a depending portion of the panel 130, which in turn is mounted on the bracket 116 at a laterally spaced location. The beamsplitter component 42 is interposed between the reflective surface 120 and the detector 128, which are aligned through an upper cord of the beamsplitter. Consequently, the laser beam is modulated by passage through the beamsplitter (and of course along a path through the remainder of the interferometer, in conventional fashion, impinging upon the retroreflectors 18, 22 thereof), to thereby produce an electrical signal for tracking the position of the moving retroreflector 22.

Figure 15:
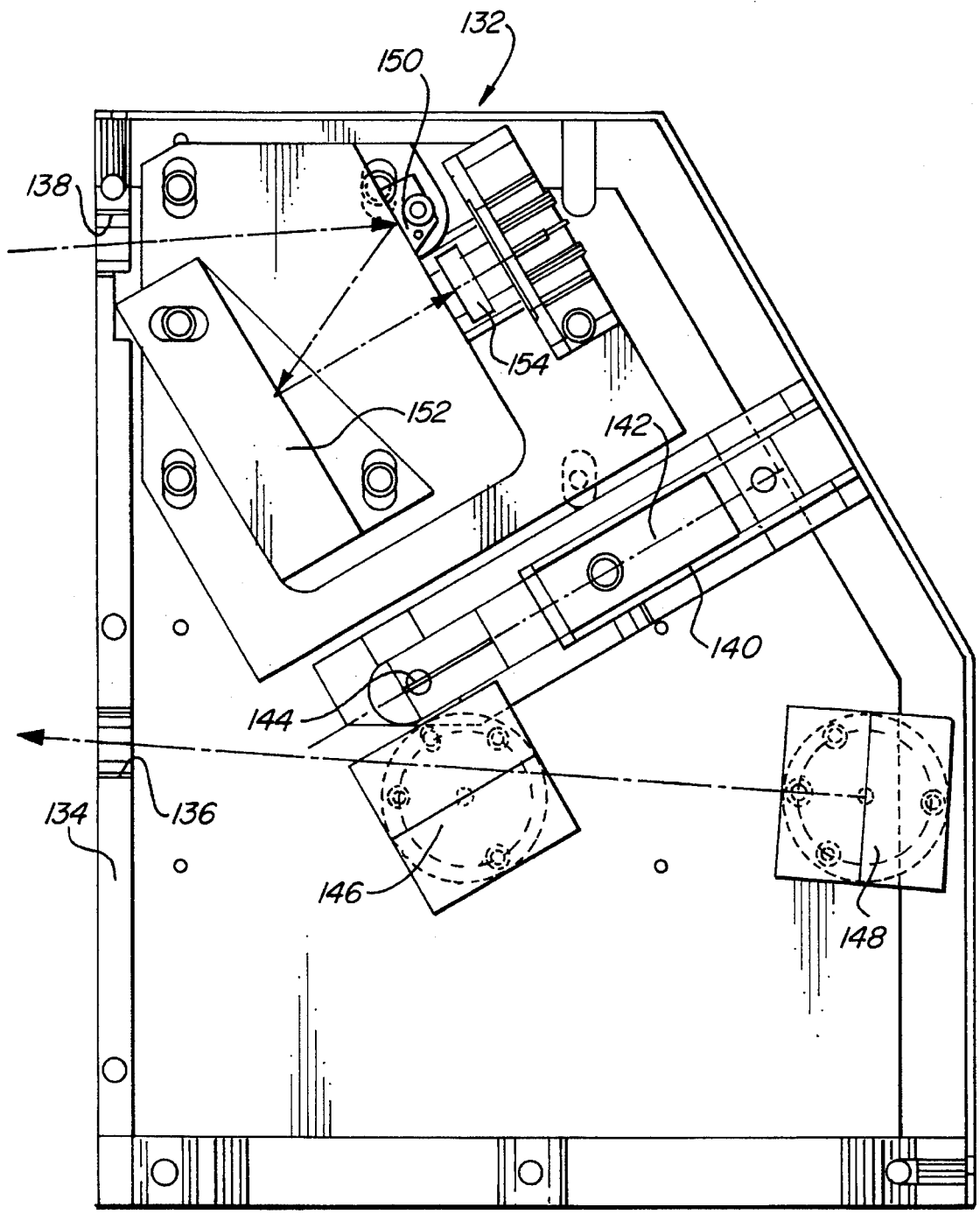
FIG. 15 is a diagrammatic elevational view of a steering module embodying the invention, with one wall removed to indicate internal features.

Turning finally to FIG. 15, the steering module depicted therein consists of a housing in which is contained a holder 140 for a radiation source unit 142, two parabolic mirrors 146 and 148, a hyperbolic mirror 150, an elliptical mirror 152, and a photoconductive detector 154. Provision of such a module is highly advantageous, in enabling fine-tuning thereon of the most critical optical alignments, thereby facilitating integration with the other modules of the system described. Radiation from the element 144 of the unit 142 is directed by the parabolic mirror 146 into the interferometer of the modulation module; the modulated radiation exiting the interferometer impinges upon the second parabolic mirror 148, and is projected thereby through the aperture 136 in the steering module wall 134. The exiting radiation enters the gas analysis cell (shown in FIG. 1), and exits therefrom to return to the enclosure 132 through the wall opening 138, It will be appreciated that the gas cell has windows 156 in registry with the apertures 136, 138, and that only one of them can be seen in FIG. 1 because the second is aligned directly below it, in the orientation depicted. The returning radiation impinges upon the hyperbolic reflector 150, and is directed thereby upon the elliptical mirror 152 and ultimately upon the detector 154.

Thus, it can be seen that the present invention provides a novel flexure plate suitable for use in constructing a motion-transfer assembly and mechanism, which plate is of relatively incomplex, one-piece construction. The plate is of highly symmetrical construction, and is adapted for assembly with an identical plate, in a mutually inverted relationship, so as to provide such a motion-transfer assembly and mechanism, immunized against the effects of extraneous forces applied thereto.

The invention also provides novel motion-transfer assemblies and mechanisms, and a novel interferometer incorporating them, a particularly desirable feature of which is a support member that has structure thereon by which a reflective component can be supported with a high degree of positional stability, while readily accommodating thermal expansion effects.

Also provided by the invention are a novel beamsplitter assembly suitable for use in an interferometer, as well as an interferometer incorporating the same, which assembly includes monolithic support structure of incomplex character and having fixed reflective surfaces thereon, and a beamsplitter component adjustably mounted by the support structure. Beamsplitter mounting means is provided by which the orientation of the beamsplitter component can readily be adjusted with a high degree of accuracy, and by which the beamsplitter component is supported with a high degree of stability while readily accommodating thermal expansion effects.

The novel optical steering module of the invention is adapted for use with an interferometer to provide an integrated radiation source and detection unit, with essential transfer optics, and the novel clocking subassembly is adapted for integration with the support structure of the beamsplitter assembly; the subassembly positions a monochromatic radiation source and detector in an optimal relationship to the beamsplitter component, and affords a high degree of stability against thermal effects. The voice-coil motor provided is of relatively low mass and yet highly efficient in operation, and is especially suitable for driving movement in an interferometer. Finally, the invention provides a novel analytical instrument in which modular systems are employed for facile removal and replacement or substitution, and in which design, configuration and arrangement factors are optimized in respect of the instrument, the systems, and the components thereof, for compactness, thermal and mechanical stability, and facility of manufacture, service, and use.

Having thus described the invention, what is claimed is:

1. A flexure plate, integrally formed as a single piece and constructed for assembly with at least one identical plate to provide a motion-transfer assembly, said plate being substantially planar and being substantially identical in orientations rotated 180° about an axis normal to its plane, said plate having lateral half-sections defined to the opposite sides of a transverse axis extending transversely through said normal axis, and having transverse half-sections defined to the opposite sides of a lateral axis extending laterally through said normal axis and perpendicular to said transverse axis, each of said lateral half-section comprising a mounting element and an elongate rocker element interconnected to said mounting element by a flexible connecting element that is so constructed and located as to permit said rocker element to rock about a point on said lateral axis while being constrained to the plane of said plate, each of said transverse half-sections comprising a support element, each of said support elements and each of said rocker elements having opposite end portions, each of said opposite end portions of each support element being interconnected by a said connecting element to the one of said end portions of said rocker elements disposed therewith in each of said transverse half-sections, whereby said support elements can reciprocate in said plane along axes substantially parallel to said lateral axis as said rocker elements rock about said points thereon.

2. The plate of claim 1 wherein said connecting elements comprise spring elements joined at their opposite ends to said mounting, rocker and support elements, each of said spring elements extending obliquely to said lateral and transverse axes.

3. The plate of claim 2 wherein said spring element interconnecting said mounting and rocker elements in one of said lateral half-sections is directed oppositely to the corresponding spring element in the other lateral half-section, wherein said spring element connecting one end portion of one of said support elements disposed in said one lateral half-section is directed like said spring element connecting the opposite end of said one support element disposed in said other lateral half-section, and wherein said spring elements connecting said one support element are directed oppositely to said spring elements connecting the other of said support elements.

4. The plate of claim 1 wherein said plate has a generally rectangular overall configuration, and wherein said connecting elements interconnecting said rocker and support elements are disposed substantially at corners of said plate.

5. The plate of claim 4 wherein said rocker elements are so configured that each has an intermediate portion disposed laterally inwardly of said end portions thereof, with each of said mounting elements lying laterally outwardly of said intermediate portion of said rocker with which said each mounting element is interconnected, wherein said end portions of each of said support elements comprise an elongate first component, and wherein each of said support elements includes an elongate second component extending transversely inwardly of said plate from said first component.

6. The plate of claim 5 wherein said second component of each of said support elements is generally rectilinear, and is joined at an intermediate location along the length of said first component and extends obliquely thereto, said second components extending along and parallel to one another.

7. A motion-transfer assembly comprised of at least two substantially identical flexure plates assembled with one another, each of said flexure plates being characterized as: integrally formed as a single piece and constructed for assembly with at least one identical plate; substantially planar and substantially identical in orientations rotated 180° about an axis normal to its plane, having lateral half-sections defined to the opposite sides of a transverse axis extending transversely through said normal axis, and having transverse half-sections defined to the opposite sides of a lateral axis extending laterally through said normal axis and perpendicular to said transverse axis, each of said lateral half-section comprising a mounting element and an elongate rocker element interconnected to said mounting element by a flexible connecting element that is so constructed and located as to permit said rocker element to rock about a point on said lateral axis while being constrained to the plane of said plate, each of said transverse half-sections comprising a support element, each of said support elements and each of said rocker elements having opposite end portions, each of said opposite end portions of each support element being connected by a said connecting element to the one of said end portions of said rocker elements disposed therewith in each of said transverse half-sections, whereby said support elements can reciprocate in said plane along axes substantially parallel to said lateral axis as said rocker elements rock about said points thereon; said connecting elements comprising spring elements joined at their opposite ends to said mounting, rocker and support elements, each of said spring elements extending obliquely to said lateral and transverse axes, said spring element interconnecting said mounting and rocker elements in one of said lateral half-sections being directed oppositely to the corresponding spring element in the other lateral half-section, said spring element connecting one end portion of one of said support elements disposed in said one lateral half-section being directed like said spring element connecting the opposite end of said one support element disposed in said other lateral half-section, and said spring elements connecting said one support element being directed oppositely to said spring elements connecting the other of said support elements; said plates being assembled in face-to-face inverted relationship to one another, mutually rotated 180° about said normal axes with said lateral and transverse axes of one of said plates mutually coincident with said lateral and transverse axes of the other of said plates, pairs of confronting spring elements cooperatively forming a multiplicity of cross-spring pivot members, each of said pivot members defining a dynamic pivot point at the intersection of said pair of spring elements of which it is comprised, and pairs of mutually confronting mounting elements, rocker elements and support elements being joined to one another to cooperatively provide, respectively, mounting members, rocker members, and support members.

8. A motion-transfer mechanism comprising a pair of said assembly of claim 7, said assemblies being spaced from one another in confronting relationship, each of said assemblies comprising transverse half-sections defined to the opposite sides of said coincident lateral axes, and said mechanism comprising transverse half-sections defined to the opposite sides of a plane including said coincident lateral axes of both of said assemblies, and wherein said mechanism further includes two bodies, each supported by one of said support members of each of said assemblies and spanning said mechanism, said transverse half sections of said mechanism being of equal mass, and said bodies being so constructed as to dispose the center of gravity of each of said transverse half-sections of said mechanism to the side of said plane opposite to the side thereof on which is disposed said support members comprising said each transverse half-section, to thereby immunize said mechanism against effects of extraneous forces.

9. The mechanism of claim 8 wherein said bodies extend between said assemblies in spaced, laterally aligned relationship with one another, said mechanism further including at least one reflective element mounted on one of said bodies, the center of gravity of said reflective element being disposed substantially on a central axis midway between and parallel to said coincident lateral axes.

10. The mechanism of claim 9 further including drive means for effecting reciprocating translational movement of said reflective element, said drive means being mounted with its center of gravity disposed substantially on said central axis, and having at least one component attached to each of said bodies.

11. A motion-transfer mechanism comprising a pair of bodies; means for supporting said bodies in mutually spaced relationship on a common axis, said means for supporting enabling reciprocating, relative translational movement of said bodies constrained substantially to said common axis; at least one reflective element mounted on one of said bodies; and drive means for effecting reciprocating translational movement of said bodies and having at least one component mounted on each of said bodies, the centers of gravity of said reflective element and said drive means being disposed substantially on said common axis, said common axis effectively dividing said pair of bodies and said means for supporting into two portions, the mass and configuration of all elements comprising said portions being such as to dynamically and statically balance one another irrespective of the orientation of said common axis, thereby immunizing said mechanism against extraneous forces.

12. The mechanism of claim 11 wherein said one body comprises a body portion and a hollow mounting portion, said mounting portion extending outwardly from said body portion and being integrally formed therewith as a single piece, said mounting portion comprising a generally circular wall of such thickness as to impart thereto rigidity in the direction of the axis of said wall and flexibility in planes transverse to said axis, said reflective element being affixed to said wall and seated therewithin.

13. The mechanism of claim 12 wherein said wall is of outwardly flaring frustoconical configuration, and wherein said reflective element is a cube-corner retroreflector, said retroreflector being seated within said wall with its corner directed toward said body portion and being attached to said wall at a plurality of points, the points of attachment being at mutually proximate locations on the periphery of said retroreflector and on the circumference of said wall.

14. The mechanism of claim 11 wherein said drive means is a voice-coil motor comprised of a hollow, electric coil component mounted on one of said bodies and a permanent magnet component mounted on the other of said bodies, said permanent magnet component including a core element telescopically received within said coil component and dimensioned and configured for relative reciprocal movement substantially on said common axis, and at least a pair of leg elements spaced to opposite sides of said core element and extending in the direction thereof and parallel thereto, each of said leg elements carrying a permanent magnet element so arranged as to produce a magnetic flux through the adjacent side of said core element, said fluxes being of equal magnitude and opposite direction for balancing the magnetic forces applied thereby to opposite portions of said coil, the inside dimensions of said coil component, the outside dimensions of said core element, and the spacing of said leg elements from said core element being such as to permit free relative movement of said coil component and said magnet component while minimizing gaps therebetween so as to maximize flux efficiency.

15. The mechanism of claim 14 wherein both said coil component and said core element have uniform rectangular cross sections in all planes taken along their entire effective lengths, the inside dimensions of said coil component being somewhat greater than the outside dimensions of said core element on axes perpendicular to transverse axes extending between said magnet elements, so as to provide sufficient spacing to accommodate a small degree of displacement of said core within said coil in the direction of said perpendicular axes and away from said common axis, such displacement resulting from slight arcuate deviation of said bodies from strict rectilinear translatory movement, due to the manner by which said bodies are supported by said supporting means.

16. A beamsplitter assembly comprising: a one-piece, integrally formed body having opposite sides and a generally medial plane therebetween, an opening extending through said body on an axis substantially normal to said plane, and laterally aligned, optically flat planar surface portions on said opposite sides of said body, said surface portions lying adjacent said opening and converging away therefrom at an acute angle to said plane; and mounting means, disposed within said opening of said body, for mounting a beamsplitter substantially parallel to said plane, said mounting means and said body having coacting elements thereon providing means for adjusting the orientation of said mounting means with respect to said plane.

17. The assembly of claim 16 wherein said surface portions of said body are of specular reflectance.

18. The assembly of claim 16 wherein said acute angle has a value of about 25°.

19. The assembly of claim 16 wherein said mounting means comprises a frame having a peripheral part and a plurality of resiliently deformable elements attached to said peripheral part for yieldingly engaging the periphery of a beamsplitter component.

20. The assembly of claim 19 wherein said frame of said mounting means is integrally formed as a single piece, and wherein said deformable elements are elongated elements, each having opposite ends at which said elements are attached to said peripheral piece.

21. The assembly of claim 16 additionally including a clocking subassembly, said subassembly including a support piece fabricated from the same material as said one-piece body and being affixed to said body, said subassembly further including, operatively disposed on said support piece, a monochromatic radiation source, a detector responsive to the radiation from said source, and optics for directing radiation from said source along a path toward said detector for impingement thereupon, said subassembly being so constructed and affixed as to operatively dispose a beamsplitter mounted by said mounting means in the path of radiation between said source and said detector.

22. A spectrometer system comprising an interferometer module and an adjacently positioned, self-contained optical steering module, said steering module including a body having means for holding an analytical radiation source element, and having thereon an analysis beam detector and first and second optical means for transfer of radiation, said first optical means being constructed and arranged to transfer radiation into said interferometer module and from said interferometer module outwardly of said steering module, and said second optical means being constructed and arranged to collect radiation from outwardly of said module and to direct the collected radiation upon said analysis beam detector.

23. The system of claim 22 wherein said means for holding comprises a cavity within said steering module body adapted for the containment of a radiation source element, and wherein said body includes one wall in which exit and entrance apertures are provided through which radiation may exit from and enter into said first and second optical means, respectively.

24. The system of claim 23 additionally including an analysis cell comprised of an enclosure including one wall with input and output windows, said one wall of said enclosure being disposed adjacent said one wall of said steering module body with said exit and entrance apertures in optical alignment with said input and output windows, respectively.

25. A flexure plate, integrally formed as a single piece and constructed for assembly with at least one identical plate to provide a motion-transfer assembly, said plate being substantially planar and being substantially identical in orientations rotated 180° about an axis normal to its plane, said plate having lateral half-sections defined to the opposite sides of a transverse axis extending transversely through said normal axis, and having transverse half-sections defined to the opposite sides of a lateral axis extending laterally through said normal axis and perpendicular to said transverse axis, each of said lateral half-section comprising an elongate rocker element so constructed as to permit said rocker element to rock about a point on said lateral axis while being constrained to the plane of said plate, each of said transverse half-sections comprising a support element, each of said support elements and each of said rocker elements having opposite end portions, each of said opposite end portions of each support element being interconnected by a flexible connecting element to the one of said end portions of said rocker elements disposed therewith in each of said transverse half-sections, whereby said support elements can reciprocate in said plane along axes substantially parallel to said lateral axis as said rocker elements rock about said points thereon.

* * * * *